United States Patent [19]
Otsuru et al.

[11] 3,873,431
[45] Mar. 25, 1975

[54] PROCESS FOR PRODUCING A RUBBER-LIKE CHLOROPRENE COPOLYMER

[75] Inventors: Masaaki Otsuru; Toshio Miyakawa; Mitsuo Yamada; Michi Izuhara, all of Shin-Nanyo, Japan

[73] Assignee: Toyo Soda Manufacturing Co., Ltd., Shin-Nanyo, Yamaguchi-ken, Japan

[22] Filed: Aug. 20, 1973

[21] Appl. No.: 389,673

[30] Foreign Application Priority Data
Sept. 22, 1972 Japan............................. 47-95525

[52] U.S. Cl... 204/159.24, 204/159.11, 204/159.22, 204/159.23, 260/78.5, 260/80.7, 260/92.3
[51] Int. Cl. ........................ C08d 1/32, C08d 3/14
[58] Field of Search..... 204/159.17, 159.23, 159.24; 260/78.5, 80.7, 92.3; 96/115 P

[56] References Cited
UNITED STATES PATENTS
2,066,330  1/1937  Carothers et al. .................. 260/80.7

2,378,189  6/1945  Clifford et al. ..................... 260/80.7
3,066,127  11/1962  Carlson et al. ..................... 260/94.3
3,397,194  8/1968  Swift ............................. 204/159.24
3,795,598  3/1974  Yukuta et al. .................. 204/159.24

FOREIGN PATENTS OR APPLICATIONS
1,159,240  7/1969  United Kingdom

Primary Examiner—Murray Tillman
Assistant Examiner—Thurman Kennis Page
Attorney, Agent, or Firm—Oblon, Fisher, Spivak, McClelland & Maier

[57] ABSTRACT

A rubber-like chloroprene and an ester of an $\alpha, \beta$-unsaturated carboxylic acid copolymer is prepared by copolymerizing chloroprene or a mixture of chloroprene, a second conjugated diene and an ester of an $\alpha, \beta$-unsaturated carboxylic acid while being subjected to ultraviolet radiation at a wavelength of 150 – 580 m $\mu$ in the presence of a catalyst composition comprising an organoaluminum compound and water. If desired, a halogen containing accelerator can also be incorporated in the catalyst composition.

10 Claims, No Drawings

PROCESS FOR PRODUCING A RUBBER-LIKE CHLOROPRENE COPOLYMER

BACKGROUND OF THE INVENTION

1. Field of the Invention

This invention relates to a process for producing a copolymer of chloroprene and an ester of an α, β-unsaturated carboxylic acid or a mixture of chloroprene, a second conjugated diene and an ester of an α, β-unsaturated carboxylic acid.

2. Description of the Prior Art

A process is known by which a copolymer of chloroprene, a second conjugated diene and an ester of an α, β-unsaturated carboxylic acid can be produced in the presence of an organoaluminum compound by treatment with ultraviolet radiation or white rays. Copolymers have been synthesized by this procedure which have a substantially alternating monomer structure. Previously, this type of alternating copolymer could not be obtained by conventional radical polymerization procedures. However, the overall reaction rate of the polymerization reaction has been less than satisfactory.

A need, therefore, exists for a method by which alternating copolymers of chloroprene or chloroprene, a second conjugated diene and an α, β-unsaturated carboxylic acid can be produced while maintaining the high degree of alternating monomer structure at high reaction rates.

SUMMARY OF THE INVENTION

Accordingly, one object of this invention is to provide a process for producing a copolymer of chloroprene and an ester of an α, β-unsaturated carboxylic acid or a copolymer of chloroprene, a second conjugated diene and an ester of an α, β-unsaturated carboxylic acid at high copolymerization rates without decreasing the alternating monomer structure of the resulting copolymer product.

Briefly, this object and other objects of the invention as hereinafter will become more readily apparent can be attained by providing a chloroprene containing copolymer prepared by copolymerizing chloroprene and an ester of α, β unsaturated carboxylic acid or a mixture of chloroprene, a second conjugated diene and an ester of an α, β-unsaturated carboxylic acid while being subjected to ultraviolet radiation in the presence of a catalyst composition which comprises an organoaluminum catalyst and a cocatalyst of water. If desired, a halogen containing accelerator can be incorporated in the catalyst composition. By use of the catalyst composition of the invention, chloroprene containing copolymers can be obtained at greater copolymerization velocities while maintaining the alternating monomer structure of the resulting copolymer.

DESCRIPTION OF THE PREFERRED EMBODIMENTS

The process of the invention for producing copolymers of chloroprene and an ester of α, β unsaturated carboxylic acid or chloroprene, a second conjugated diene and an ester of an α, β-unsaturated carboxylic acid is conducted by the following procedure. Usually, the solvent for polymerization reaction, if one is required, a halogen containing accelerator, water, an ester of an α, β-unsaturated caroboxylic acid, an organoaluminum compound and chloroprene or a mixture of chloroprene and a second conjugated diene are mixed in the indicated order at about room temperature. If butadiene is selected as one of the diene components, then the butadiene is preferably cooled as it is added to the monomers. The components which form the polymerization mixture can be mixed in any order desired under an inert atmosphere with the proviso that any mixing procedure which calls for the direct contact of the organoaluminum compound with chloroprene be avoided. One method of avoiding direct contact of these components is to add the organoaluminum compound to a mixture which contains the ester of an α, β-unsaturated caroboxylic acid.

The copolymerization reaction is conducted under the following polymerization conditions immediately after the reaction mixture is mixed. Alternatively, the reaction mixture can be aged for a limited time after mixing the components. If the reaction mixture is aged at 0°–45°C for 1–48 hours in a dark place, an increased polymerization rate occurs and the average polymerization degree of the resulting copolymer is increased. The polymerization reaction is performed at a temperature of −15°∼+80°C, preferably 0°∼+60°C. The pressure over the polymerization medium is not critical and can be greater or less than atmospheric pressure. However, the pressure should be sufficient to maintain the solvent and monomers in the liquid state. Usually the pressure is less than 20 kg/cm$^2$, especially less than 5 kg/cm$^2$. Preferably, the polymerization reaction system is stirred in order to maintain a uniform distribution of the monomers, the catalyst and the resulting copolymer, and to diminish or reduce any significant temperature differences between different parts of the reaction system as well as to increase the efficiency of the system. However, when the reaction is conducted on small scale industrial operations, a non-agitated reaction medium can be used.

The light sources which emit ultraviolet light or white rays for promoting the polymerization reaction include sun-lights, tellurium lamps, tungsten lamps, super high pressure mercury arc lamps, high pressure mercury arc lamps and the like. Especially preferable is a commercial high pressure or a super high pressure mercury arc lamp or a tellurium lamp which emits light with a wavelength of 150 mμ to 580 mμ. Effective exposure of the polymerization medium calls for 0.1 to 100 watts of electric power to irradiate 1,000 ml of the polymerization medium. Preferably an inner irradiation type lamp is used whereby the light source is directly inserted into the polymerization reactor. It is also possible to use an outer irradiation type lamp for small reactors made of glass ampoules or continuous flow type reactors. In any case, it is necessary to prevent the transfer of heat from the light source to the polymerization reaction medium. The polymerization reaction can always be conducted in a uniform liquid phase whereby a viscous reaction system is formed depending upon the increase in conversion.

The polymerization reaction can be stopped by any conventional manner such as by adding an excess of water, phenol or alcohol to the reaction medium. In order to separate the resulting polymer from the reaction solution, the solvent and the unreacted monomers are removed from the reaction mixture. Most any conventional method can be used to remove these materials. However, a steam-stripping method is the simplest. In small size operations, precipitation of the polymer product with methanol is the simplest procedure. In order to dry the copolymer after the solvent is removed, any conventional procedure which is used to dry synthetic rubber can be used.

The second conjugated diene which is combined chloroprene in the copolymerization reaction includes such dienes as butadiene and isoprene. Copolymers containing these monomer units having lower glass transition points and have improved sulfur vulcanization properties. The molar ratio of chloroprene or the mixture of chloroprene and the second conjugated diene to the ester of an α, β-unsaturated carboxylic acid usually ranges from 20:80 to 80:20, preferably from 40:60 to 60:40. When mixtures of chloroprene and isoprene, chloroprene and butadiene, or chloroprene, isoprene and butadiene are used, or when a plurality of esters of α, β-unsaturated carboxylic acids are used, the indicated molar ratios are calculated by considering the mixed conjugated dienes as one diene and the mixed unsaturated carboxylic acids as one acid. The amounts of individual conjugated dienes combined to form a diene mixture and the amounts of individual esters of α, β-unsaturated carboxylic acids combined to form a carboxylic acid ester mixture can be varied as desired. Thus, it is possible to alter the amounts of the components at will in order to achieve a combination which gives the type of product desired. Suitable examples of the esters of the α, β-unsaturated carboxylic acids include methacrylic esters having 1–18 carbon atoms in the alcoholic portion of the ester molecule such as methyl methacrylate, ethyl methacrylate, propyl methacrylate, allyl methacrylate, n-butyl methacrylate, iso-butyl methacrylate, crotyl methacrylate, n-amyl methacrylate, n-hexyl methacrylate, hexenyl methacrylate, cyclohexyl methacrylate, n-octyl methacrylate, n-nonyl methacrylate, 2-ethylhexyl methacrylate n-decyl methacrylate, stearyl methacrylate, and oleyl methacrylate; acrylic esters having 1–18 carbon atoms in the alcoholic portion of the ester molecule such as methyl acrylate, ethyl acrylate, propyl acrylate, allyl acrylate, n-butyl acrylate, crotyl acrylate, n-amyl acrylate, n-hexyl acrylate, hexenyl acrylate, n-octyl acrylate, n-nonyl acrylate, 2-ethyl hexyl acrylate, n-decyl acrylate, stearyl acrylate and oleyl acrylate. The preferred esters include methyl methacrylate, allylmethacrylate, n-butyl methacrylate, 2-ethylhexyl methacrylate, n-decyl methacrylate, crotyl methacrylate, oleyl methacrylate, ethyl acrylate, butyl acrylate, 2-ethylhexyl acrylate and oleyl acrylate.

At least one ester of an α, β-unsaturated caroxylic acid can be copolymerized with chloroprene or a mixture of chloroprene and a second conjugated diene. Suitable monomer combinations include combinations of two monomers such as chloroprene-methylmethacrylate, chloroprene-n-butyl methacrylate, chloroprene-ethyl acrylate, chloroprene-n-butyl acrylate, chloroprene-2-ethylhexyl methacrylate, chloroprene-2-ethylhexyl acrylate; combination of three monomers such as chloroprene-methylmethacrylate-2-ethylhexyl methacrylate, chloroprene-methyl methacrylate-stearyl methacrylate, chloroprene-methylmethacrylate-allyl methacrylate, chloroprene-2-ethylhexyl methacrylate-n-butyl methacrylate, chloroprene-methylmethacrylate-n-butyl acrylate, chloroprene-2-ethylhexyl methacrylate-oleyl methacrylate, chloroprene-isoprene-methylmethacrylate, chloroprene-isoprenebutyl acrylate, chloroprene-butadiene-methylmethacrylate, and chloroprenebutadiene-n-butyl acrylate; and combinations of four monomers such as chloroprene-methyl methacrylate-2-ethylhexyl methacrylate-allyl methacrylate, chloroprene-isoprene-methylmethacrylate-2-ethylhexyl methacrylate, chloroprene-isoprene-methylmethacrylate-allyl methacrylate, chloroprene-butadiene-methylmethacrylate-2-ethylhexyl methacrylate, chloroprene-butadiene-methylmethacrylate-allyl methacrylate, chloropreneisoprene-methylmethacrylate-allyl methacrylate, and chloroprene-methyl methacrylate-2-ethylhexyl methacrylate-oleyl methacrylate. The previously mentioned diene mixtures of chloroprene-isoprene, chloroprene-butadiene, and chloroprene-isoprene-butadiene are also included in the scope of the diene mixtures of this invention.

Bulk polymerization procedures can be used to conduct the polymerization reaction of the invention. However, a solvent is preferably used in the reaction medium. The amount of solvent incorporated with the monomers can vary widely. However, it is preferable for practical applications to use a solvent in amounts ranging from 10–70 percent by weight of the copolymer in the solution. Suitable solvents used for the polymerization reaction of the invention include haloaliphatic hydrocarbons such as dichloroethane, trichloroethylene, trichloroethane, tetrachlorethane, tetrachloroethylene, pentachloroethane, carbon tetrachloride, tetrabromoethane and hexachlorobutadiene; aromatic hydrocarbons such as benzene, xylene and toluene, haloaromatic hydrocarbons such as monochlorobenzene, dichlorobenzene, monochlorotoluene and dichlorotoluene.

The organoaluminum compounds which are used as the (A) component of the polymerization catalyst of this invention have the formula

Al R$_2$X or

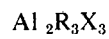

Al $_2$R$_3$X$_3$ wherein R represents a C$_1$–20 hydrocarbon group, and X represents at least one halogen atom selected from the group of Fl, Cl, Br and I. Suitable organoaluminum compounds include diethylaluminum chloride and ethylaluminum sesquichloride. The amount of the organoaluminum compound used is in the range of 0.1 to 10 mole percent especially 0.25 to 5 mole percent based on the total monomer content.

The amount of water which is used as the (B) component of the catalyst is preferably in the range of 0.10 to 1.75, especially 0.15 to 1.5 mole per gram atom of aluminum in catalyst component (A). If the amount of water used is outside of this range, the effect of water on the copolymerization reaction is insufficient. Water can be added simply as water or as an aqueous solution of phosphoric acid or an inorganic salt.

The addition of the halogen-containing accelerator which is the (C) component of the catalyst system is not critical and is added in amounts which permit effective control the polymerization velocity and the polymerization degree as desired since the addition of only small amounts of the accelerator cause an increase in the polymerization activity and a decrease in the average polymerization degree. Suitable halogen containing accelerators include halocarbonyl aromatic compounds containing halogen and carbonyl groups in the molecule such as α-bromoacetophenone, α-chloroacetophenone, tetrabromophthalic anhydride and tetrachlorophthalic anhydride; halomethyl aromatic compounds such as α-chloromethylnaphthalene, α-bromomethylnaphthalene, benzylbromide; and polyhalogeno compounds such as tetrachlorobenzene, carbon tetrabromide; bromine and the like. The amount of the halogen containing accelerator used can vary as previously indicated. However, preferably from 0.01 to 1 mole of the accelerator is used per gram atom of aluminum in catalyst component (A). It is especially preferable to use from 0.05 to 0.5 mole of accelerator per gram atom of aluminum.

The function of water in the copolymerization reaction is to modify the complex formed of the ester of an α, β-unsaturated carboxylic acid and the organoaluminum compound, whereby a complex is formed which has a desired Lewis acidity for the promotion of the copolymerization reaction. The presence of the halogen-containing accelerator may cause an increase in the numbers of sites for the initiation of the copolymerization reaction. The copolymers produced by the process of this invention have good rubber-like elasticity, and can be roller kneaded for use as rubber-like materials, although the elasticity varies slightly depending upon the components and formula of the monomers used. Elemental analysis of the resulting copolymer of the invention show that chlorine is present in the polymer product. Chloroprene homopolymers are insoluble in acetone, but the copolymers of this invention are acetone soluble. The solubility differences then between the two types of polymers establishes whether or not the polymer produced is a conjugated diene homopolymer or a copolymer of a conjugated diene and an ester of an α, β-unsaturated carboxylic acid.

Both elemental analysis and the nuclear magnetic resonance or NMR spectrum of the product copolymer reveals that the monomers present in the copolymer are present in a 1:1 mole ratio of chloroprene or the mixture of chloroprene and a second conjugated diene to the ester of an α, β-unsaturated carboxylic acid. The analytical data further indicates that the number of continuous chloroprene units is small, while most of the conjugated diene units are connected to units of the ester of α, β-unsaturated carboxylic acid. Thus, the substantially alternating structure of a linear product copolymer is confirmed.

The copolymers produced by the process of this invention can be used as rubber-like materials having high oil resistance and weather durability. The copolymers are miscible with various rubbers and plastics, and can be used as suitable rubber modifiers, plastic modifiers, fiber modifiers, and the like. The copolymers produced from a wide variety of esters of α, β-unsaturated carboxylic acids have numerous applications. The latter copolymers are useful as blending rubbers for improvement of the oil resistance, ozone resistance, and heat ageing-resistance characteristics of other materials. The copolymer is also useful as an adhesive agent, as a sealing agent and in paints. When butadiene or isoprene is used as part of the conjugated diene component of the total diene content of the raw material, or when an ester of an α, β-unsaturated carboxylic acid is used which has an unsaturated hydrocarbon radical in the alcoholic portion of the ester molecule in the raw material composition, the copolymer product can be vulcanized with sulfur or covulcanized with any other suitable conventional rubber. For example, the copolymer can be used as a rubber modifier to improve the weather durability, heat ageing-resistance, oil resistance, roller processibility, and the like of styrenebutadiene rubbers, polybutadiene rubbers, polyisoprene rubbers, ethylenepropylene diene rubbers and the like.

Having generally described this invention, a further understanding can be obtained by reference to certain specific examples which are provided herein for purposes of illustration only and are not intended to be limiting unless otherwise specified. In the Examples, the expression "mole/l" is defined as the number of moles of the particular component per liter of the total reaction component mixture.

EXAMPLE 1

Into a 50 ml reaction tube made of hard glass (25 mm outer diameter, 20 mm inner diameter and a length of 100 mm) and purged with nitrogen was added 11 ml of purified monochlorobenzene, 57 mmole/l of water, 2 mole/l of methyl methacrylate and 50 mmole/l of ethylaluminum sesquichloride ($Et_3Al_2Cl_3$) to the mixture was added 2 mole/l of chloroprene and the volume of the liquid mixture was 20 ml. The reaction tube was sealed and inserted into a water bath kept at 25°C. It was maintained at a 5 cm distance from a high pressure SHL–100UV2 mercury arc lamp manufactured by Toshiba Co., Ltd. (100 watt with a conversion efficiency of a net photo energy of 15.7 percent). The mixture was irradiated with ultraviolet rays from the exterior of the reaction tube for 20 hours without stirring in order to conduct the copolymerization reaction. After the copolymerization reaction, the reaction tube was opened and the reaction mixture was added to methanol to precipitate solid material and the product was purified by reprecipitation two times from chloroform-methanol, and was dried in vacuum at room temperature for more than 48 hours whereby 6.51 g of a white rubber-like elastomer was obtained. The conversion of the monomers was 86.3 percent and the intrinsic viscosity of the product at 25°C in chloroform was 3.80 dl/g.

The product was completely soluble in carbon tetrachloride and acetone, which confirmed that the product was a copolymer and did not contain homopolymer products of methylmethacrylate or chloroprene. The NMR spectrum of the copolymer had signals attributable to chloroprene and methyl methacrylate. Methylene proton signals attributable to homopolymeric chloroprene were not found in the NMR spectrum. The intensities of the NMR signals of both monomer units in the copolymer were relatively high, thus indicating that a substantial number of chloroprene and methyl methacrylate units were bonded together. Also, the number of continuous chloroprene units in the copolymer appeared to be very small. The single sharp signal of the methyl group of methylmethacrylate bonded to methylmethacrylate was found. However, the intensity of the signal suggested that the number of continuous methylmethacrylate-methylmethacrylate units in the copolymer is very small. Moreover, the molar ratio of chloroprene to methylmethacrylate in the resulting copolymer as measured from the area ratios of the NMR signals was 51:49. Thus, this data suggested that most of the chloroprene was alternately bonded to methylmethacrylate units in the structure of the copolymer. The signal of the methine portion of the chloroprene units of the copolymer was positioned at 5.4 ppm indicating a trans 1,4 disposition of the chloroprene unit in the copolymer.

In a second experiment, the same procedure was followed without the presence of water as a reference experiment. The yield of the copolymer was 3.18 g and the conversion of the monomers was 42.2 percent. The intrinsic viscosity of the copolymer measured at 25°C in chloroform was 0.64 dl/g, and the molar ratio of chloroprene to methylmethacrylate in the copolymer as measured from the area ratios of the signals of the NMR spectrum was 64:36. It was found that the polymerization velocity and the polymerization degree of the copolymer produced by using the water containing catalyst of this invention, were substantially higher than those of the latter process of the reference experiment. Moreover, the molar ratio of the monomers in the copolymer was about 1:1.

EXAMPLES 2 and 3

The process of Example 1 was followed except that the amount of water added to the reaction mixture was changed to 15 mmole/l or 80 mmole/l, wherein the copolymerization reaction of chloroprene and methylmethacrylate was conducted. The results obtained are shown in Table I.

TABLE I

| Example | $H_2O$ (mmole/l) | $H_2O$/Al * | Yield (g) | Conversion (%) | $[\eta]$ dl/g |
|---|---|---|---|---|---|
| 2 | 15 | 0.15 | 3.10 | 41.1 | 0.80 |
| 3 | 80 | 0.80 | 5.49 | 72.9 | 3.95 |

$[\eta]$ : intrinsic viscosity measured at 25°C in chloroform.
\* : mole of $H_2O$ per 1 g atom of Al.

EXAMPLES 4–5

The process of Example 1 was followed except that chloroprene and methylmethacrylate were used as the monomers in a molar ratio of 60:40 or 40:60, and the reaction was conducted at 40°C in the presence of 40 mmole/l of ethylaluminum sesquichloride ($Et_3Al_2Cl_3$) and 40 mmole/l of water, wherein the copolymerization of chloroprene and methylmethacrylate was conducted. The molar percent of each monomer used and the results obtained are shown in Table II together with the results of a reference experiment which contained no water in the catalyst composition.

The data clearly indicates that the polymerization velocity and the polymerization degree of the copolymer obtained by using the ethylaluminum sesquichloride-water catalyst of this invention were substantially greater than those of the reference experiment.

EXAMPLE 6

Into a 50 ml reaction tube made of hard glass (outer diameter of 25 mm, inner diameter of 20 mm and a length of 100 mm) and purged with nitrogen was added 12 ml of pure monochlorobenze, 15 mmole/l of water, 2 mole/l of methylmethacrylate and 10 mmole/l of ethylaluminum sesquichloride ($Et_3Al_2Cl_3$). To the mixture was added 2 mole/l of chloroprene whereby the total volume of the liquid solution was 20 ml. The reaction tube was sealed and inserted into a water bath left at 60°C at a distance of 5 cm from a light source which was a high pressure SHL-100 UV2 mercury arc lamp manufactured by Toshiba Co., Ltd. (100 watt and a conversion efficiency with a net photo energy of 15.7 percent). The tube was irradiated with ultraviolet rays for 8 hours with stirring. Subsequently, the procedure of Example 1 was followed. The yield of the copolymer obtained was 2.18 g and the conversion of the monomers was 28.9 percent. The intrinsic viscosity of the copolymer at 30°C in chloroform was 2.53 dl/g. The same experiment was repeated except that water was not added to the catalyst system as a reference experiment. The yield of the copolymer was 1.51 g and the conversion of the monomers was 19.9 percent while the intrinsic viscosity measured at 30°C in chloroform was 1.18 dl/g. It was found that the polymerization velocity and polymerization degree of the copolymer obtained from the experiment in which water was present in the catalyst system of this invention were substantially greater than those of the copolymer formed in the reference experiment.

EXAMPLE 7

The process of Example 1 was followed except that 50 mmole/l of water was used in the catalyst system, and the reaction was conducted at 60°C for 8 hours whereby the copolymerization of chloroprene and methylmethacrylate was accomplished. The yield of the copolymer was 4.24 g, and the conversion of the monomers was 56.3 percent. The intrinsic viscosity of the copolymer at 30°C in chloroform was 4.20 dl/g.

The same process was followed in a second reference experiment except that water was not used in the catalyst system. The yield of the copolymer produced was 2.68 g and the conversion of the monomers was 35.5 percent. The intrinsic viscosity of the copolymer was 1.17 dl/g. The data indicates that the polymerization velocity and polymerization degree of the copolymer obtained by using the water containing catalyst of this invention, were substantially greater than those of the reference experiment.

EXAMPLE 8

Into a 6,000 ml reactor made of glass equipped with a stirrer and an insertable thallium lamp 100 WUT-

TABLE II

| | Monomers (fed) (mole %) | | $H_2O$ (mmol/l) | Conversion (%) | $[\eta]$ (dl/g) | Copolymer formula | |
|---|---|---|---|---|---|---|---|
| | CP | MMA | | | | CP | MMA |
| Reference | 60 | 40 | 0 | 49.8 | 0.95 | 67 | 33 |
| Example 4 | 60 | 40 | 40 | 85.9 | 1.20 | 60 | 40 |
| Reference | 40 | 60 | 0 | 43.0 | 0.78 | 59 | 41 |
| Example 5 | 40 | 60 | 40 | 62.1 | 1.05 | 56 | 44 |

CP : chloroprene.   MMA : methylmethacrylate
$[\eta]$ : intrinsic viscosity measured at 25°C in chloroform
Copolymer formula: measured from elemental analytical data L-102 light source manufactured by Ushio Electric Co., Ltd. (100 watt and a conversion efficiency with a net photo energy of 15.7 percent) and purged with nitrogen was added 2,756 ml of dried monochlorobenzene, 30 mmole of water, 1.0 mmole/l of methylmethacrylate, 0.5 mole/l of stearyl methacrylate, 30 mmole/l of ethylaluminum sesquichloride ($Et_3Al_2Cl_3$). To the mixture was added 1.5 mole/l of chloroprene until the volume of all of the components was 5,000 ml. The effective exposure dose of light was 3.1 watt/1,000 ml. The reactor was dipped into a water bath maintained at a constant temperature whereby the polymerization temperature was kept at 25°C by controlling the temperature with a cooling medium. The contents of the reactor were stirred while being subjected to the radiation. After 24 hours of exposure to the light, 2,2-methylenebis (4-methyl-6-tert-butyl-phenol) was added as a polymerization inhibitor to the resulting viscous product. The contents were transferred to a 20l evaporator made of stainless steel, and the unreacted monomers and the solvent were separated from the reaction mixture by steam evaporation with injected steam at a pressure of 1.7 kg/cm². After the mixture was evaporated, water was removed from the copolymer remaining by a centrifugal dehydrator. The copolymer was then further dried at 60°C under reduced pressure until a constant weight was obtained. The resulting copolymer was a white rubber-like elastomer and the yield of the copolymer was 1,900 g while the conversion of the monomers was 95.0 percent and the intrinsic viscosity of the copolymer at 30°C in chloroform was 4.50 dl/g. The molar ratio of chloroprene: methylmethacrylate: stearyl methacrylate in the copolymer as determined from the area ratios of the NMR signals was 52:30:18.

A second reference experiment was conducted on which the same procedure was followed except that water was not in the catalyst system. The yield of the copolymer was 1,200 g, and the conversion was 60.0 percent, while the intrinsic viscosity of the copolymer was 2.50 dl/g. The data obtained indicates that the polymerization velocity and the average polymerization degree of the copolymer obtained by the process of the Example in which a catalyst of aluminum chloride and water was used were substantially superior than the properties obtained from the reference copolymer.

EXAMPLE 9

Into a 6,000 ml reaction made of glass equipped with a stirrer and an insertable high pressure mercury arc lamp light source manufactured by Ushio Electric Co., Ltd. (100 watt and a conversion efficiency with a net photoenergy of 15.7 percent) and purged with nitrogen at room temperature, were charged 2,464.3 ml of dried monochlorobenzene, 30 mmole/l of water, 1.35 mole/l of 2-ethylhexyl methacrylate, 0.15 mole/l of oleyl methacrylate, 30 mmole/l of ethylaluminum sesquichloride ($Et_3Al_2Cl_3$). To the mixture was added 1.5 mole/l of chloroprene until a final volume of 5,000 ml was obtained. The effective exposure dose of light was 3.1 watt/1000ml. The process of Example 4 was followed thereafter to complete the copolymerization reaction of the monomers. The resulting copolymer was a white rubber-like elastomer. The yield of the copolymer was 2,188 g, and the conversion of the monomers was 97 percent while the intrinsic viscosity of the copolymer at 30°C in chloroform was 5.70 dl/g.

A second reference experiment was conducted by the same process except that water was not present in the catalyst system. The yield of the copolymer was 1,421 g and the conversion of the monomers was 63 percent while the intrinsic viscosity of the copolymer at 30°C in chloroform was 3.80 dl/g. These results indicate that the catalyst system which contained aluminum sesquichloride and water was superior to the catalyst system which only contained aluminum sesquichloride. Incidentally, the resulting copolymer contained oleyl methacrylate units which have a double bond in the hydrocarbon group of the alcoholic portion of the ester, which made it possible to subject the copolymer to conventional sulfur vulcanization techniques. It was also possible to covulcanize the copolymer with other rubber materials which proved the usefulness of the copolymer as an effective modifier of styrene-butadiene rubber, polybutadiene rubber and ethylene-propylene rubber.

EXAMPLE 10

Into a 50 ml reaction tube made of glass (outer diameter of 25 mm, inner diameter of 20 mm and a length of 100 mm) and purged with nitrogen at room temperature was added 10 ml of pure monochlorobenzene, 80 mmole/l of water, 2 mole/l of n-butyl acrylate, 80 mmole/l of ethylaluminum sesquichloride ($Et_3Al_2Cl_3$). To the mixture was added 2 mole/l of chloroprene until a final liquid volume of 20 ml was obtained, and the tube was sealed. The process of Example 1 was followed thereafter. The yield of the copolymer was 2.34 g, and the conversion of the monomers was 27.0 percent while the intrinsic viscosity at 25°C in chloroform was 0.85 dl/g. The molar ratio of chloroprene to n-butyl acrylate in the copolymer as determined by the elemental analysis was 63:37.

A second, reference experiment was conducted by the same procedure except that water was not used in the catalyst system. The yield of the copolymer was 1.54 g and the conversion of the monomers was 17.8 percent while the intrinsic viscosity of the copolymer at 25°C in chloroform was 0.77 dl/g. The molar ratio of chloroprene to n-butyl acrylate in the copolymer as determined by elemental analysis was 66:34.

EXAMPLE 11

The process of Example 1 was followed except that 100 mmole/l of diethylaluminum chloride ($Et_3AlCl$) was used instead of ethylaluminum sesquichloride, and 100 mmole/l of water was used instead of the indicated amount of water to conduct the copolymerization reaction of chloroprene and methyl methacrylate. The yield of the copolymer was 2.33 g and the conversion of the monomers was 30.9 percent while the intrinsic viscosity of the copolymer at 30°C in chloroform was 2.65 dl/g.

A second, reference experiment was conducted by the same procedure except that water was not used in the catalyst system. The yield of the copolymer was 1.61 g and the conversion of the monomers was 21.4 percent while the intrinsic viscosity of the copolymer at 30°C in chloroform was 0.70 dl/g. The data obtained indicates that the polymerization velocity and the polymerization degree of the copolymer obtained by using the catalyst system of diethylaluminum chloride and water substantially greater than the properties of the reference copolymer obtained from the catalyst system devoid of water.

EXAMPLE 12

Into a 50 ml reaction tube made of hard glass (outer diameter of 25 mm, inner diameter of 20 mm and a length of 100 mm) and purged with nitrogen at room temperature was added 11 ml of pure monochlorobenzene, 26 mmole/l of α-bromoacetophenone, 2 mole/l of methylmethacrylate, 40 mmole/l of water and 30 mmole/l of ethylaluminum sesquichloride ($Et_3Al_2Cl_3$). To the mixture was added 2 mole/l of chloroprene until the liquid volume was 20ml. The tube was sealed, and dipped into a water bath kept at 25°C at a distance of 5 cm from a light source equipped with a high pressure, SHL-100UV2 mercury arc lamp manufactured by Toshiba Co., Ltd. (100 watt and a conversion efficiency with a net photoenergy of 15.7 percent). The tube was irradiated with ultraviolet radiation for 20 hours without stirring to conduct the copolymerization reaction. After the copolymerization reaction was completed, the reaction tube was opened and the reaction mixture was added to methanol to precipitate solid material. The product obtained was purified by reprecipitation two times from a chloroform-methanol solution and was dried in vacuum at room temperature for more than 48 hours whereby a 5.75 g yield of a rubber-like elastomer was obtained. The conversion of the monomers was 76.3 percent and the intrinsic viscosity of the product at 30°C in chloroform was 0.90 dl/g. The product was completely soluble in carbon tetrachloride and acetone, thus confirming that the material did not contain homopolymers of methylmethacrylate or chloroprene. The NMR spectrum of the copolymer showed that the resulting copolymer had a substantially alternating monomer structure. The molar ratio of chloroprene to methylmethacrylate in the copolymer as determined by the area ratios of the NMR signals was 58:42.

A reference experiment was conducted by the same process in which α-bromoacetophenone was not used. The yield of the copolymer obtained was 3.11 g, and the conversion of the monomers was 41.2 percent while the intrinsic viscosity of the copolymer at 30°C in chloroform was 1.97 dl/g. The molar ratio of chloroprene to methylmethacrylate in the copolymer as determined by the area ratios of the NMR signals was 61:39. The polymerization velocity of the copolymer of this invention was greater than that of the copolymer of the reference experiment.

EXAMPLE 13

The process of Example 12 was followed except that 100 mmole/l of diethylaluminum chloride ($Et_2AlCl$) was used instead of ethylaluminum sesquichloride and that 25 mmole/l of α-chloromethylnaphthalene was used instead of α-bromoacetophenone to perform the copolymerization reaction of chloroprene and methylmethacrylate. The yield of the copolymer obtained was 5.25 g and the conversion of the monomers was 69.7 percent while the intrinsic viscosity of the copolymer at 30°C in chloroform was 1.03 dl/g.

A second, reference experiment was conducted by the same procedure except that α-chloromethylnaphthalene was not used. The yield of the copolymer was 2.23 g and the conversion of the monomers was 30.9 percent while the intrinsic viscosity of the copolymer at 30°C in chloroform was 2.65 dl/g. The superior polymerization velocity obtained when the catalyst component of 2-chloromethylnaphthalene was used, was found.

EXAMPLE 14

Into a 50 ml reaction tube made of hard glass (outer diameter of 25 mm, inner diameter of 20 mm and a length of 100 mm) and purged with nitrogen at room temperature was added 10 ml of pure monochlorobenzene, 30 mmole/l of α-chloromethylnaphthalene, 2 mole/l of n-butyl acrylate, 75 mmole/l of water, 50 mmole/l of ethylaluminum sesquichloride ($Et_3Al_2Cl_3$). To the mixture was added 2 mole/l of chloroprene until a liquid volume of 20 ml was obtained, and the tube was sealed. The process of Example 12 was followed thereafter. The yield of the copolymer was 4.49 g and the conversion of the monomers was 51.8 percent while the intrinsic viscosity of the copolymer at 30°C in chloroform was 0.68 dl/g.

A second, reference experiment was conducted by the same procedure except that α-chloromethylnaphthalene was not used. The yield of the copolymer was 2.56 g and the conversion of the monomers was 29.6 percent while the intrinsic viscosity of the copolymer at 30°C in chloroform was 1.52 dl/g. The superior polymerization velocity obtained when the catalyst component of α-chloromethylnaphthalene was used, was found.

EXAMPLES 15–18

The process of Example 12 was followed except that 30 mmole/l of tetrabromophthalic anhydride, 30 mmole/l of carbon tetrabromide, 30 mmole/l of bromine, or 30 mmole/l of benzylbromide was used instead of chloroprene and methylmethacrylate. Reference experiment 1 was the same process except that no halide containing component was used. Reference experiment 2 was the same process except that no halide and water catalyst components were present. The results are shown in Table III.

| Example | Al component mmole/l | $H_2O$ mmole/l | Halide | Amount of Halide | Yield (g) | Conversion (%) | [η] (d/g) |
|---|---|---|---|---|---|---|---|
| 15 | 30 | 40 | tetrabromophthalic anhydride | 30 | 4.32 | 57.3 | 1.05 |
| 16 | 30 | 40 | carbon tetrabromide | 30 | 5.70 | 75.5 | 0.36 |
| 17 | 30 | 40 | bromine | 30 | 4.56 | 60.5 | 0.92 |
| 18 | 30 | 40 | benzyl bromide | 30 | 3.92 | 51.9 | 1.34 |
| Reference 1 | 30 | 40 | — | — | 3.11 | 41.2 | 1.97 |
| Reference 2 | 30 | — | — | — | 2.33 | 30.9 | 0.50 |

EXAMPLE 19

Into a 6,000 ml reactor made of glass equipped with a stirrer and an insertable thallium lamp UTL-450 light source manufactured by Ushio Electric Co., Ltd. (450 watt and a conversion efficiency with a net photoenergy of 34.2 percent) and purged with nitrogen at room temperature was added 3,168 ml of dried monochlorobenzene, 10 mmole of α-bromoacetophenone, 0.90 mole/l of methylmethacrylate, 0.45 mole/l of 2-ethylhexyl methacrylate, 0.15 mole/l of allyl methacrylate, 40 mmole/l of ethylaluminum sesquichloride ($Et_3Al_2Cl_3$) and 60 mmole/l of water. To the mixture was added 1.5 mole/l of chloroprene until a final liquid volume of 5,000 ml was obtained. The reactor was dipped into a water bath kept at constant temperature whereby the polymerization temperature was kept at 25°C by control with the cooling medium. Irradiation of the reactor by the thallium lamp was conducted while the components were stirred. The effective exposure dose of light was 51 watt/1,000ml. After 65 hours of exposure to the light, 2,2'-methylene bis(4-methyl-6-tertbutylphenol) was added to the resulting viscous product as a polymerization inhibitor. The contents of the reactor were transferred to a 20l evaporator made of stainless steel, and the unreacted monomers and the solvent were evaporated by injection of steam at a pressure of 1.7 kg/cm². After evaporation of the materials, water was removed from the copolymer by a centrifugal dehydrator, and the copolymer was further dried at 60°C under reduced pressure until a constant weight was obtained. The resulting copolymer was a white rubber-like elastomer. The yield of the copolymer was 1,406 g and the conversion of the monomers was 85.1 percent while the intrinsic viscosity of the copolymer at 30°C in chloroform was 2.30 dl/g.

A second, reference experiment was conducted by the same procedure except that α-bromoacetophenone was not used. The yield of the copolymer obtained was 1,160 g and the conversion of the monomers was 70.1 percent while the intrinsic viscosity of the copolymer was 3.10 dl/l. The polymerization velocity of the copolymer obtained from the process in which the catalyst system containing ethylaluminum sesquichloride, water, and α-bromoacetophenone was used was substantially superior than the polymerization velocity of the copolymer obtained from the reference experiment. The copolymer obtained from the Example contained allyl methacrylate units wherein the allyl groups were part of the alcoholic group of the ester. Thus, the copolymer could bee vulcanized with sulfur.

EXAMPLE 20

Into a 4,000 ml reactor made of glass equipped with a stirrer and an insertable light source of a high pressure, UM-452 mercury arc lamp manufactured by Ushio Electric Co., Ltd. (450 watt and a conversion efficiency with a net photoenergy of 34.2 percent) and purged with nitrogen at room temperature was added 2,064 ml of dried monochlorobenzene, 20 mmole/l of α-bromoacetophenone, 1.5 mole/l of methylmethacrylate, 40 mmole/l of ethylaluminum sesquichloride ($Et_3Al_2Cl_3$), 60 mmole/l of water, 1.2 mole/l of chloroprene and 0.3 mole/l of isoprene in the indicated order until a total volume of 3,000 ml was obtained. The process of Example 19 was followed thereafter except that the polymerization reaction was conducted for 44 hours to effect the copolymerization reaction of chloroprene-isoprene-methylmethacrylate. The yield of the copolymer was 673 g and the conversion of the monomers was 81.3 percent while the intrinsic viscosity of the copolymer at 30°C in chloroform was 1.80 dl/g.

A second, reference experiment was conducted by the same process without the presence of α-bromoacetophenone. The yield of the copolymer obtained was 568 g and the conversion of the monomers was 68.1 percent while the intrinsic viscosity of the copolymer was 3.00 dl/g.

EXAMPLE 21

Into a 50 ml reaction tube made of hard glass (outer diameter of 25 mm, inner diameter of 20 mm and a length of 100 mm) and purged with nitrogen was added 12 ml of purified monochlorobenzene, 1.35 mole/l of methylmethacrylate, 40 mmole/l of ethylaluminum sesquichloride, 60 mmole/l of water and 2.0 mole/l of chloroprene in the indicated order until a total volume of 20 ml was attained. The reaction tube was sealed and maintained at room temperature for 24 hours with stirring while the reaction tube was wrapped with aluminum foil to prevent exposure to light. The copolymerization procedure of Example 1 was followed. The yield of the resulting copolymer was 5.02 g and the conversion to the monomers was 93.7 percent while the intrinsic viscosity at 30°C in chloroform was 5.23 dl/g.

As a second, reference experiment the same procedure was followed except that the solution was not aged. A copolymer product was obtained in a yield of 4.18 g, a conversion of 78.0 percent and an intrinsic viscosity is 4.50 dl/g. The polymerization velocity and the polymerization degree of the copolymer produced using the ageing process were substantially greater than the properties of the nonaged copolymer.

The process of this Example was followed except that water was not used in the catalyst. The yield of the copolymer product was 1.99 g and the conversion was 37.1 percent while the intrinsic viscosity was 0.67 dl/g.

EXAMPLE 22

Into a 6,000 ml reactor made of glass equipped with a stirrer and an insertable high pressure mercury arc lamp (100 watts and a conversion efficiency with a net photoenergy of 15.7 percent) and purged with nitrogen at room temperature was added sequentially 3,789 ml of dried monochlorobenzene, 0.6 mole/l of methyl methacrylate, 50 mmole/l of ethylaluminum sesquichloride ($Et_3Al_2Cl_3$), 100 mmole/l of $H_2O$, 0.2 mole/l of 2-ethylhexyl methacrylate, 0.2 mole/l of allyl methacrylate and 1.0 mole/l of chloroprene until a total liquid volume of 5,000 ml was obtained. The mixture was then stirred at room temperature for 24 hours while shielded from light in order to age the solution. The reactor was dipped into a low temperature, constant temperature bath to maintain the reaction temperature at 25°C. The mercury arc lamp was turned on to provide an effective dose of 3.1 watt/1,000 ml. After the mixture was exposed to the light for 24 hours, 2,2'-methylene bis-(4-methyl-6-tert-butylphenol) was added as a polymerization inhibitor to the viscous reaction mixture. The contents of the reactor were removed in an evaporator made of stainless steel under a pressure of 1.7 kg/cm$^2$ with injected steam. By this procedure the unreacted monomers and the solvent were evaporated from the reaction mixture. After evaporation of the materials, the copolymer was dehydrated by centrifugal separation and was dried at 60°C under reduced pressure to give a copolymer having a constant weight. The copolymer was a white rubber-like elastomer. The yield per hour was 22.2 g and the intrinsic viscosity in chloroform at 30°C was 4.95 dl/g.

A second, reference experiment was conducted by the same procedure except that water was not used. The yield per hour was 5.7 g, and the intrinsic viscosity was 1.35 dl/g. It was found that the polymerization velocity and average polymerization degree of the copolymer prepared from the water containing catalyst system were substantially greater than the polymerization velocity and average polymerization degree of the copolymer prepared from the non water containing catalyst.

EXAMPLES 23 and 24

The process of Example 22 was followed except that the amount of water used was 25 mmole/l and 150 mmole/l respectively for Examples 23 and 24 to copolymerize chloroprene, methyl methacrylate, 2-ethylhexyl methacrylate and allyl methacrylate. The results are shown in Table IV.

| Example | H$_2$O (mmole/l) | H$_2$O/A* | Yield/hr. g/hr. | [$\eta$] dl/g |
|---|---|---|---|---|
| 23 | 25 | 0.25 | 6.1 | 1.51 |
| 24 | 150 | 1.50 | 7.7 | 2.15 |

(* mole of H$_2$O per gram atom of Al)

EXAMPLE 25

The process of Example 1 was followed except that 51 mmole/l of an aqueous phosphoric acid solution was used instead of water to copolymerize chloroprene and methyl methacrylate. The yield of copolymer was 6.63 g, and the conversion of the monomers was 87.9 percent while the intrinsic viscosity at 30°C in chloroform was 1.27 dl/g. When this data is compared to that of the Reference experiment of Example 1, it is clear that the polymerization velocity and the polymerization degree of the copolymer produced in Example 25 in which the aqueous phosphoric acid solution was used are greater than the same properties of the copolymer of Example 1.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a process for producing a rubber-like elastomer which comprises copolymerizing chloroprene and an ester of an $\alpha$, $\beta$-unsaturated carboxylic acid or a mixture of chloroprene, a second conjugated diene and an ester of an $\alpha$, $\beta$-unsaturated carboxylic acid in the presence of an organoaluminum catalyst by exposure to ultraviolet radiation, the improvement which comprises incorporating a cocatalyst of water in amounts of 0.10 to 1.75 mole per gram atom of aluminum in said organoaluminum catalyst, whereby a catalyst composition is formed.

2. The process of claim 1, wherein a halogen containing accelerator is further incorporated in said catalyst composition in amounts of 0.01–1 mole per gram atom of aluminum in said organoaluminum catalyst.

3. The process of claim 1, wherein water as pure water or as an aqueous solution of phosphoric acid or an inorganic salt is incorporated in said catalyst.

4. The process of claim 2, wherein said halogen containing accelerator is a halocarbonyl aromatic compound, a halomethyl aromatic compound or a polyhalogeno compound.

5. The process of claim 1, wherein said organoaluminum catalyst is added to a reaction mixture which contains an ester of an $\alpha$, $\beta$-unsaturated carboxylic acid.

6. The process of claim 1, wherein the reaction mixture for said copolymerization reaction is aged at 0°–45°C for 1–48 hours.

7. The process of claim 1, wherein said second conjugated diene is butadiene or isoprene.

8. The process of claim 1, wherein an inert solvent is added to said copolymerization system.

9. A chloroprene containing copolymer prepared by a process which comprises copolymerizing chloroprene and an ester of an $\alpha$, $\beta$-unsaturated carboxylic acid or a mixture of chloroprene, a second conjugated diene and an ester of an $\alpha$, $\beta$-unsaturated carboxylic acid while being exposed to ultraviolet radiation in the presence of a catalyst composition which comprises a mixture of an organoaluminum catalyst and a cocatalyst of water wherein said water is present in amounts ranging from 0.10 to 1.75 mole per gram atom of aluminum in said organoaluminum catalyst.

10. The chloroprene containing copolymer of claim 9, wherein said catalyst composition further comprises a halogen containing accelerator present in amounts ranging from 0.01 to 1 mole per gram atom of aluminum in said organoaluminum catalyst.

* * * * *